Nov. 5, 1957  L. WOOLF  2,811,822
WHEEL OPERATED GRASS SHEARS
Filed Jan. 24, 1957  2 Sheets-Sheet 1

INVENTOR.
Levi Woolf
BY *Victor J. Evans & Co.*
ATTORNEYS

Nov. 5, 1957 L. WOOLF 2,811,822
WHEEL OPERATED GRASS SHEARS
Filed Jan. 24, 1957 2 Sheets-Sheet 2

INVENTOR.
Levi Woolf
BY Victor J. Evans & Co.
ATTORNEYS

United States Patent Office 2,811,822
Patented Nov. 5, 1957

2,811,822

WHEEL OPERATED GRASS SHEARS

Levi Woolf, Sebring, Ohio

Application January 24, 1957, Serial No. 636,048

4 Claims. (Cl. 56—241)

This invention relates to a cutting implement, and more particularly to grass shears.

The object of the invention is to provide grass shears which include a pair of cutting blades that are operated as the implement is moved along the ground.

Another object of the invention is to provide a grass shears which includes a pair of cutting blades that are actuated or operated by movement of the implement along the ground whereby it is not necessary to use a squeezing action to operate the blades.

A further object of the invention is to provide a cutting implement which is extremely simple and inexpensive to manufacture.

Other objects and advantages will be apparent during the course of the following description.

In the accompanying drawings, forming a part of this application, and in which like numerals are used to designate like parts throughout the same.

Figure 1:
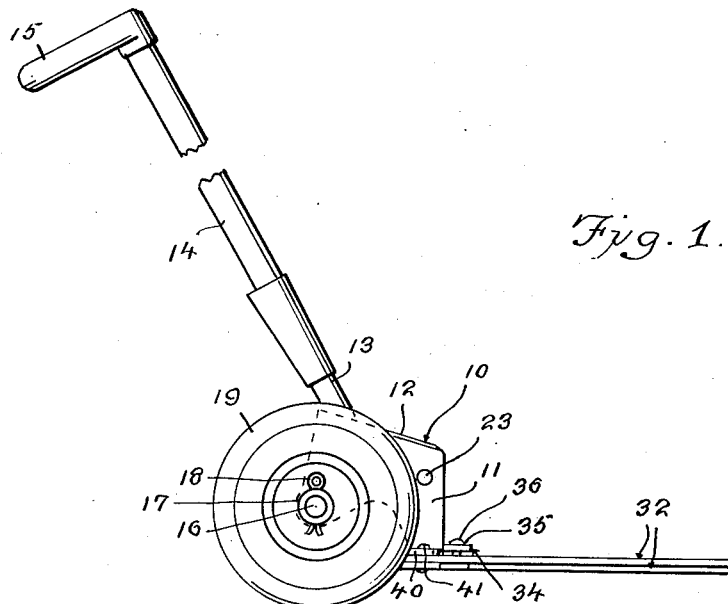
Figure 1 is a side elevational view of the cutting implement, constructed according to the present invention.
Figure 2:
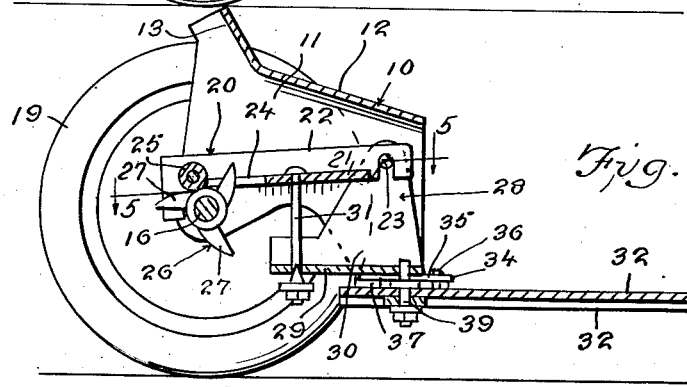
Figure 2 is a vertical sectional view taken through the cutting implement of the present invention on the line 2—2 of Fig. 7, and is drawn to a larger scale than Fig. 1.

Referring in detail to the drawings, the numeral 10 indicates a housing or frame which can be made of any suitable material such as metal, and the housing 10 includes a top wall 12 and a pair of spaced parallel vertically disposed side walls 11, Figure 2. Extending upwardly from the upper portion of the housing 10 and secured thereto or formed integral therewith is an upstanding inclined collar 13. A bar 14 is secured to the collar 13 in any suitable manner, and the upper end of the bar 14 has a handle 15 extending therefrom, Figure 1, whereby the implement can be readily manually moved along the ground, as when grass is being cut.

Figure 4:
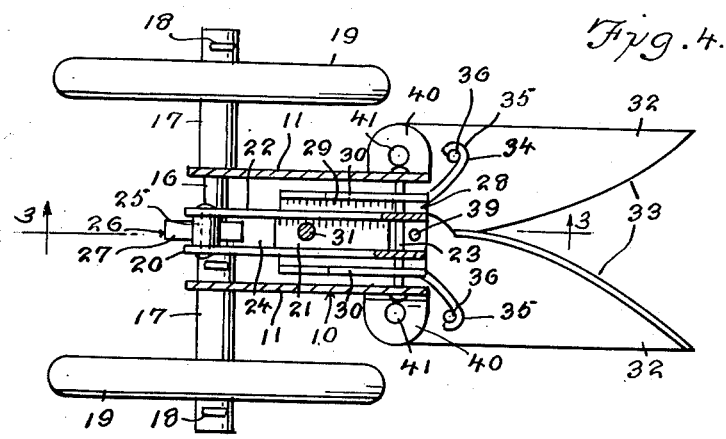
Figure 4 is a horizontal sectional view taken through the implement on the line 4—4 of Fig. 3, and is drawn to a larger scale than Fig. 1.
Figure 4:
Figure 5:
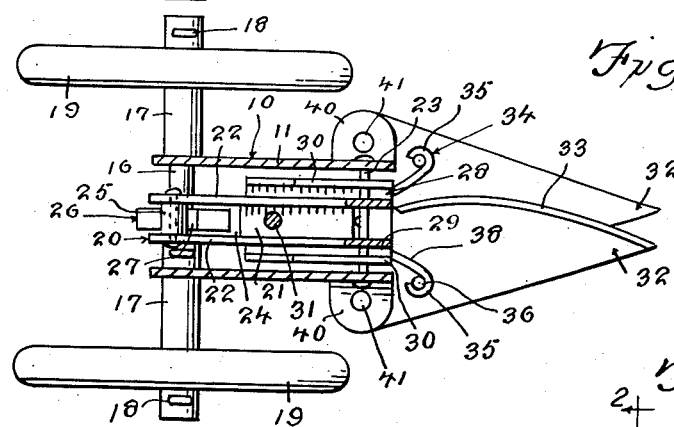
Figure 5 is a view similar to Figure 4, but showing the blades in closed position and is taken on the line 5—5 of Fig. 2, and drawn to a larger scale than Fig. 1.
Figure 5:
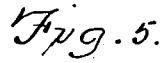
Figure 6:
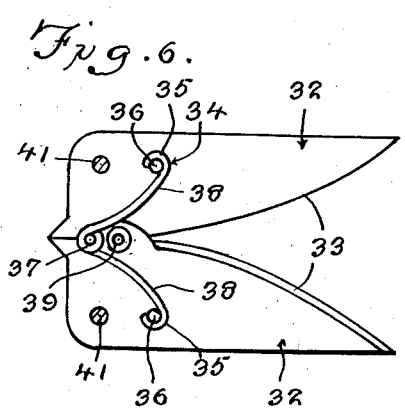
Figure 6 is a fragmentary plan view illustrating a pair of cutting blades.
Figure 7:
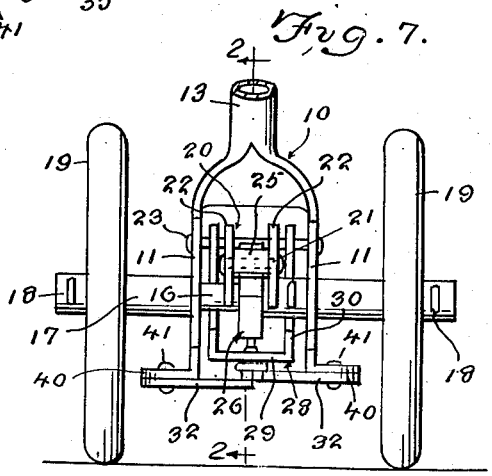
Figure 7 is an enlarged fragmentary elevational rear end view of the cutting implement.

The cutting implement of the present invention further includes a horizontal axle 16, and mounted on each end of the axle 16 is a hollow sleeve 17, the sleeve 17 being secured in place in any suitable manner, as for example, by means of pins or keys 18, Figure 4. Mounted on each sleeve 17 is a ground engaging wheel 19.

Positioned within the housing 10 is a movable bracket which is indicated generally by the numeral 20, and the bracket 20 includes a bottom wall 21 and a pair of spaced parallel vertically disposed side portions 22. A pin 23 extends through slots in the pair of side portions 22, and the pin 23 has its ends connected to the side walls 11 of the housing 10. The bottom portion 21 of the bracket 20 is provided with a cutout 24, and a roller 25 is supported by the bracket 20. A star wheel 26 is mounted on the axle 16, and the star wheel 26 includes a plurality of cams 27 which are mounted for movement into and out of engagement with the roller 25, as the axle 16 and star wheel 26 rotate.

Arranged within the housing 10 is a support member which is indicated generally by the numeral 28, and the support member 28 includes a base 29 and a pair of spaced parallel side pieces 30. The upper ends of the side pieces 30 are mounted on the pin 23 which is supported by the housing 10, for a purpose to be later described.

The cutting implement of the present invention further includes a pair of similar blades 32, and each blade 32 is provided with an inner cutting edge 33. A spring member 34 connects the pair of blades 32 together, Figure 2, and the spring member 34 includes a pair of diverging arms 38 which each terminate in a curved finger 35, and the fingers 35 are connected to pins or securing elements 36 which extend from the blades 32. The spring member 34 further includes an intermediate coiled portion 37, and the spring member 34 tends to normally bias or urge the blades in a direction which is opposite from that to which the blades are moved by reason of the previously described structure.

As shown in Figure 2, a bolt or securing element 31 extends between the bottom portion 21 of the bracket 20, and the base 29 of the support member 28. A bolt or pin 39 connects the rear portions of the blades 32 to the base 29 of the support member 28. Extending outwardly from the lower edge of each of the side pieces 30 of the support member 28 is an apertured ear 40, and bolts or pins 41 serve to pivotally connect the blades 32 to the ears 40, Figure 4.

Figure 3:
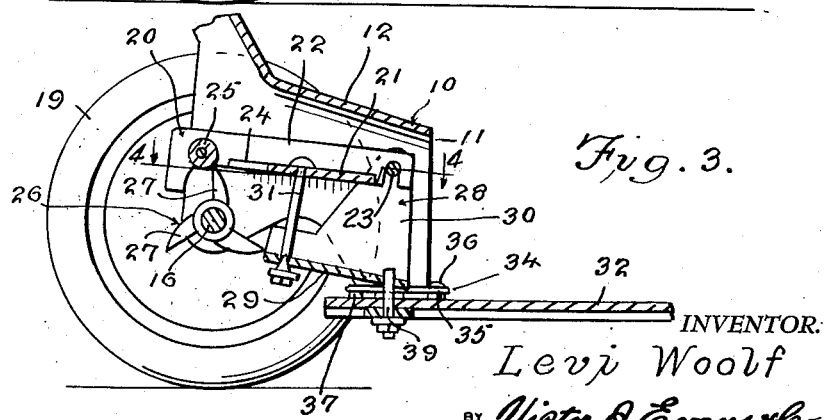
Figure 3 is a view similar to Figure 2, but showing the parts in adjusted position and is taken on the line 3—3 of Fig. 4, and drawn to a larger scale than Fig. 1.

From the foregoing it is apparent that there has been provided a cutting implement which is especially suitable for use in cutting or trimming grass. In use, the handle 15 is adapted to be gripped in the user's hand or hands, and then the implement is moved along the ground on the wheels 19. As the wheels 19 rotate, they cause rotation of the axle 16, and this rotation of the axle 16 results in rotation of the star wheel 26. This rotation of the star wheel 26 causes the cams 27 to turn so that the cams 27 will move into engagement with the roller 25 of the bracket 20 whereby the bracket 20 will be pivoted on the pin 23. As the bracket 20 pivots on the pin 23, the bolt 31 will be raised and this will lift the support member 26 which results in rearward movement of the pin or bolt 39, so that the parts move from the position shown in Figure 2 to the position shown in Figure 3. This rearward movement of the bolt 39 causes the pair of blades 32 to move to closed position so that the cutting edges 33 will move towards each other whereby the grass will be severed or trimmed or cut. Continued movement of the implement will result in further rotation of the axle 16 and star wheel 26 whereby the cams 27 will move beyond the roller 25 and into registry with the cutout 24 in the bracket 20. Thus, the bracket 20 can pivot on the pin 23 so that it can be turned to the position shown in Figure 2 from the position shown in Figure 3 and at the same time the spring members 34 will move the blades 32 to open position. This cycle of movement is repeated continuously as the implement is moved along the ground so that a continuous cutting action is provided. Thus, it will be seen that grass can be effectively trimmed due to the provision of the pair of movable cutting blades 32 which have their cutting edges 33 adapted to move towards and away from each other, and this movement of the blades 32 is brought about by the movement of the implement along the ground. Thus, the present invention eliminates the necessity of using a mechanism which is actuated by a manual squeezing process which has been proven to be tiresome and inefficient. Also, the implement is ruggedly constructed so that it will withstand long periods of usage.

The implement includes the long bar 14 which has the handle 15 secured thereto so that grass can be continually trimmed as around shrubbery or along walks or the like or in other localities where a lawn mower cannot be effectively used. The cutting implement is operated by merely pushing the implement along the ground and it is not necessary to squeeze any handles to perform the cutting action. Thus, the implement is easy to use and the grass can be cut quickly and readily. The wheels 19 provide the necessary traction so that the implement can be used on wet or dry grass and the device is extremely simple and inexpensive to assemble or manufacture.

The drive wheels 19 are secured to the axle 16, and the star wheel 26 is also secured to the axle 16, the star wheel 26 serving to raise the bracket 20 and this movement of the bracket 20 causes corresponding movement of the support member 28 due to the provision of the connecting pin 31. This movement causes the bolt 39 to be moved so that the blades 32 will be moved to closed position and when the star wheel clears the roller 25, the blades 32 will be moved to open position due to the provision of the spring member 34.

I claim:

1. In a cutting implement, an axle, a pair of sleeves mounted on said axle, a ground engaging wheel connected to each of said sleeves, a housing including a pair of spaced parallel vertically disposed side walls each having an opening therein for the projection therethrough of said axle, an apertured ear extending outwardly from each of said side walls, a pair of blades having their rear ends pivotally connected to said ears, said blades including inner cutting edges mounted for movement towards and away from each other, a pin extending between the side walls of said housing and supported thereby, a bracket of U-shape pivotally mounted on said pin and said bracket including a bottom portion and spaced parallel vertically disposed side portions, there being a cutout in the bottom portion of said bracket, a roller supported in the rear of said bracket, a star wheel mounted on said axle intermediate the ends thereof and said star wheel including a plurality of cams mounted for movement into and out of engagement with said roller and cutout, a support member arranged in said housing and including a base, and said support member further including a pair of spaced parallel vertically disposed side pieces connected to said pin, a securing element extending between the base of said support member and the bottom wall of said bracket, and a pin connecting said blade to the base of said support member.

2. The structure as defined in claim 1 and further including resilient means connecting said pair of blades together.

3. The structure as defined in claim 1 and further including a collar extending upwardly from said housing, an elongated bar connected to said collar, and a handle connected to the upper end of said bar.

4. In a cutting implement, an axle, a pair of sleeves mounted on said axle, a ground engaging wheel connected to each of said sleeves, a housing including a pair of spaced parallel vertically disposed side walls each having an opening therein for the projection therethrough of said axle, an apertured ear extending outwardly from each of said side walls, a pair of blades having their rear ends pivotally connected to said ears, said blades including inner cutting edges mounted for movement towards and away from each other, a pin extending between the side walls of said housing and supported thereby, a bracket of U-shape pivotally mounted on said pin and said bracket including a bottom portion and spaced parallel vertically disposed side portions, there being a cutout in the bottom portion of said bracket, a roller supported in the rear of said bracket, a star wheel mounted on said axle intermediate the ends thereof and said star wheel including a plurality of cams mounted for movement into and out of engagement with said roller and cutout, a support member arranged in said housing and including a base, and said support member further including a pair of spaced parallel vertically disposed side pieces connected to said pin, a securing element extending between the base of said support member and the bottom wall of said bracket, a pin connecting said blades to the base of said support member, resilient means connecting said pair of blades together, said resilient means comprising a spring member having intermediate coiled portion, the ends of said spring member being connected to said blades, said housing including an upstanding collar, a bar connected to said collar, and a handle connected to the upper end of said bar.

References Cited in the file of this patent

UNITED STATES PATENTS

| | | |
|---|---|---|
| 1,449,438 | Petricko | Mar. 29, 1923 |
| 1,860,317 | Clack | May 24, 1932 |
| 2,574,858 | Carter | Nov. 13, 1951 |